United States Patent [19]

Ueda et al.

[11] Patent Number: 5,020,767
[45] Date of Patent: Jun. 4, 1991

[54] MOTOR MOUNTING STRUCTURE FOR WASHING MACHINES

[75] Inventors: Masami Ueda, Ichinomiya; Michiaki Ito, Seto, both of Japan

[73] Assignee: Kabushiki Kaisha Toshiba, Kanagawa, Japan

[21] Appl. No.: 475,763

[22] Filed: Jan. 30, 1990

[30] Foreign Application Priority Data

Jan. 31, 1989 [JP] Japan ................................. 1-22409
Feb. 28, 1989 [JP] Japan ................................. 1-47725
Feb. 28, 1989 [JP] Japan ................................. 1-47727

[51] Int. Cl.$^5$ ............................................. F16M 13/00
[52] U.S. Cl. .................................... 248/638; 248/639; 248/632; 248/613
[58] Field of Search ............... 248/632, 638, 613, 666, 248/639, 634

[56] References Cited

U.S. PATENT DOCUMENTS

| 2,214,942 | 9/1940 | Taub | 248/613 X |
| 3,057,218 | 10/1962 | Knerr et al. | 248/666 X |
| 4,713,714 | 12/1987 | Gatti et al. | 248/613 X |

Primary Examiner—Alvin C. Chin-Shue
Attorney, Agent, or Firm—Philip M. Shaw, Jr.

[57] ABSTRACT

A motor mounting structure for washing machines includes a motor mount mounted on the outer bottom of a water-receiving tub by bolts and having an upper surface and short columnar rubber buffers interposed between a bracket of a motor and the upper surface of the motor mount. Metallic end plates are secured to upper and lower ends of each rubber buffer so that each rubber buffer is coupled to the motor bracket and the upper surface of the motor mount, respectively.

18 Claims, 3 Drawing Sheets

MOTOR MOUNTING STRUCTURE FOR WASHING MACHINES

BACKGROUND OF THE INVENTION

This invention relates to washing machines wherein a motor is mounted on the outer bottom of a water-receiving tub, and more particularly to a motor mounting structure for such washing machines wherein the motor is mounted on the outer bottom of the water-receiving tub with non-metallic elastic bodies interposed therebetween.

In washing machines and more particularly, full automatic washing machines, the rotation of a motor is transmitted through a belt to a transmission mechanism provided on the outer bottom of a water-receiving tub for driving an agitator mounted within the water-receiving tub. Conventionally, a plurality of motor mounting bosses are provided on the outer bottom of the water-receiving tub so as to be downwardly projected. A bracket of the motor is secured to the bosses by bolts.

Recently, reduction of noise produced by the motor has been one of important technical concerns in the field of washing machines. However, since the motor bracket is directly coupled to the bosses formed on the outer bottom of the water-receiving tub in the above-described conventional construction, mechanical and electromagnetic vibrations produced by the motor are transmitted to the water-receiving tub through the bracket and bosses. Consequently, the water-receiving tub is may be vibrated, resulting in increased of noise. Furthermore, should the bolts fixing the motor be loosened for some reason and fall off, there is a possibility that the motor may fall off, which could be dangerous.

In order to prevent the motor vibration from being transmitted to the water-receiving tub and causing noise, the motor has been mounted on the outer bottom of the water-receiving tub with buffer members interposed therebetween. In this respect, when the buffer members are coil springs, it is difficult to cut off slight vibration causing noise since the coil springs are formed from a metallic material. On the other hand, a non-metallic elastic body such as a lump of rubber is effective for the reduction of noise. However, such a non-metallic elastic body is low in tensile strength and has a problem of reduction of its strength with deterioration due to age.

SUMMARY OF THE INVENTION

Therefore, an object of the present invention is to provide a motor mounting structure for washing machines which can reduce the noise resulting from vibration of the motor.

Another object of the present invention is to provide a motor mounting structure for washing machines which does not suffer from either the deterioration due to age and low tensile strength of an elastic body provided for absorption of the motor vibration, or the loosening of bolts for fixing the motor.

To achieve these objects, the invention provides a motor mounting structure for a washing machine wherein a motor is mounted on a water-receiving tub, the motor being provided with a bracket integrally formed on the outer periphery thereof and a pulley mounted on a drive shaft downwardly projected so that a driven load is coupled to the drive shaft through a belt, said motor mounting structure comprising a motor mount provided on the outer bottom of the water-receiving tub, the motor mount having an upper side and a buffer interposed between the motor bracket and the upper side of the motor mount so as to be subjected to a compressive force through the bracket, said buffer including a lumped non-metallic elastic body having two ends and two end plates each secured to each one of two end faces of the elastic body and each of coupled to each of the bracket and the upper side of the motor mount respectively.

Since the elastic body interposed between the motor bracket and the motor mount is formed from a non-metallic material with no metallic core employed, vibration caused by the bracket of the motor as a noise source may be effectively absorbed by the elastic body, thereby preventing the vibration from being transmitted to the motor mount. Since the elastic body is interposed between the motor bracket and the motor mount so as to be subjected to the weight of the motor as a compressive load, the strength of the elastic body is rendered stable. Furthermore, as the result of the above-described construction, the upper side of the motor mount is necessarily positioned beneath the motor bracket. Consequently, should bolts fixing the motor bracket or the like fall off for some reason, the motor bracket is received by the motor mount thereof, thereby preventing the motor from removal off immediately upon the falling of the bolts.

It is preferable that a plurality of buffers are interposed between the motor bracket and the upper side of the motor mount, instead of only one buffer, and that the plurality of buffers are dispersed and thus disposed both in a driven load side and a side opposite thereto with respect to the motor drive shaft.

When the tensile force of the belt inclines the motor to one side or the other, only the compressive force acts on the elastic bodies on one side and only the tensile force acts on the elastic bodies on the other side. Accordingly, each elastic body does not suffer from both the compressive and tensile forces simultaneously and the bending stress which would result from this.

The number of the buffers may preferably be larger in the driven load side than in the side opposite thereto.

More elastic bodies are disposed in the side where the tensile force acts on the elastic bodies than in the side where the compressive force acts on the elastic bodies. Consequently, even when each elastic body employed has a relatively small strength against the tensile load, sufficient strength of each elastic body disposed in the side where the tensile force acts thereon may be obtained.

Other objects of the invention will become obvious upon understanding of the illustrative embodiment about to be described or will be indicated in the appended claims, and various advantages not referred to herein will occur to one skilled in the art upon employment of the invention in practice.

DESCRIPTION OF THE PREFERRED EMBODIMENT

An embodiment of the present invention will now be described with reference to the accompanying drawings.

Figure 1:
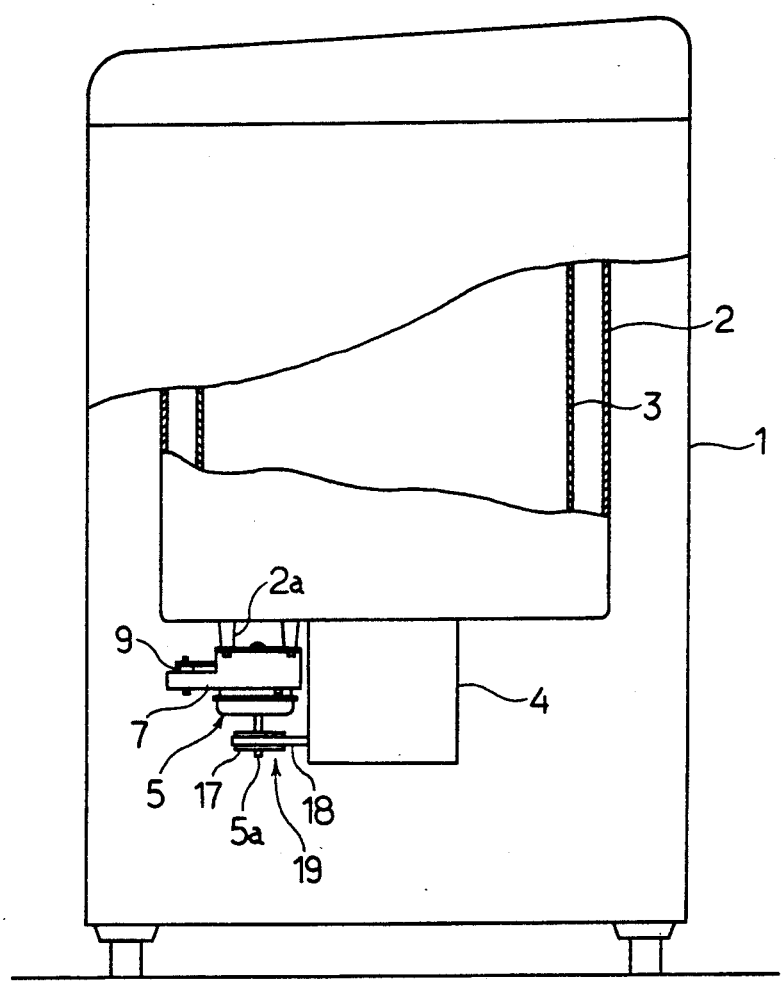
FIG. 1 is a partially broken side view of a washing machine embodying the present invention.

Referring to FIG. 1, reference numeral 1 designates an outer cabinet of a washing machine and more specifically, an automatic washing machine. A water-receiving tub 2 is mounted within outer cabinet 1 by way of an elastic suspension mechanism (not shown). A rotating tub 3 is rotatably mounted within water-receiving tub 2. An agitator (not shown) is provided on the inner bottom of rotating tub 3. A transmission 4 is provided on the central outer bottom of water-receiving tub 2 for selectively transmitting rotation of an electric motor 5 to the agitator or rotating tub 3.

Figure 3:
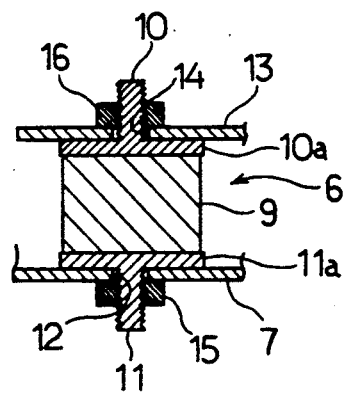
FIG. 3 is an enlarged longitudinal section of a buffer.

A mounting structure for motor 5 will now be described. Four bosses 2a are downwardly projected on the outer bottom of water-receiving tub 2. Two flanges 7a of a generally U-shaped motor mount 7 are secured to bosses 2a by tightening screws 8 into screw holes 7b from below. Motor 5 is mounted on motor mount 7 so as to be disposed in the central space of U-shaped motor mount 7. Each buffer 6 comprises an elastic body 9 formed from, for example, rubber as shown in FIG. 3. Elastic body 9 is lumped into, for example, a short columnar configuration. Bolts 10 and 11 are secured on the central portions of end plates 10a and 11a by way of welding or the like, respectively. The ends of each elastic body 9 are rigidly secured to end plates 10a and 11a respectively, by an adhesive, A method of forming buffer 6 will be described. In making an elastic body 9, polymers are kneaded with an additive agent such as carbon or sulfur added thereto, in a kneading step. Thereafter, the kneaded material is left for a while. Being hardened to some degree, the material is cut into a predetermined size, thereby obtaining unshaped or unmolded rubber. Adhesive is applied to one side each of of end plates 10a and 11a each of which has another side to which bolts 10 and 11 are secured at the central portions, respectively, and the adhesive is dried. End plates 10a, with 11a and the un-molded rubber sandwiched therebetween, are put into a mold, which is then heated for ten minutes, for example at 160° C. The heating causes the adhesive layers to rigidly secure end plates 10a and 11a to respective ends of a rubber column as an elastic body. The above-mentioned heating temperature and period may vary depending on the material and hardness of the un-molded rubber. Bolt 11 at the lower side of buffer 6 is inserted through a bolthole 12 formed through motor mount 7, from above. Bolt 10 at the upper side of buffer 6 is inserted through a bolthole 14 formed through bracket 13 of motor 5, from above. In this condition, nuts 15 and 16 are threadably engaged with bolts 10 and 11 to be tightened up, respectively. A plurality of, for example three, such buffers 6 as described above are disposed around motor 5 and bracket 13 of motor 5 is mounted on motor mount 7 via these three buffers 6. A pulley 17 is secured on a drive shaft 5a of motor 5 which extends downwardly. A belt 18 is provided between pulley 17 and a pulley (not shown) of transmission 4, thereby constituting a belt transmission mechanism 19.

Figure 4:
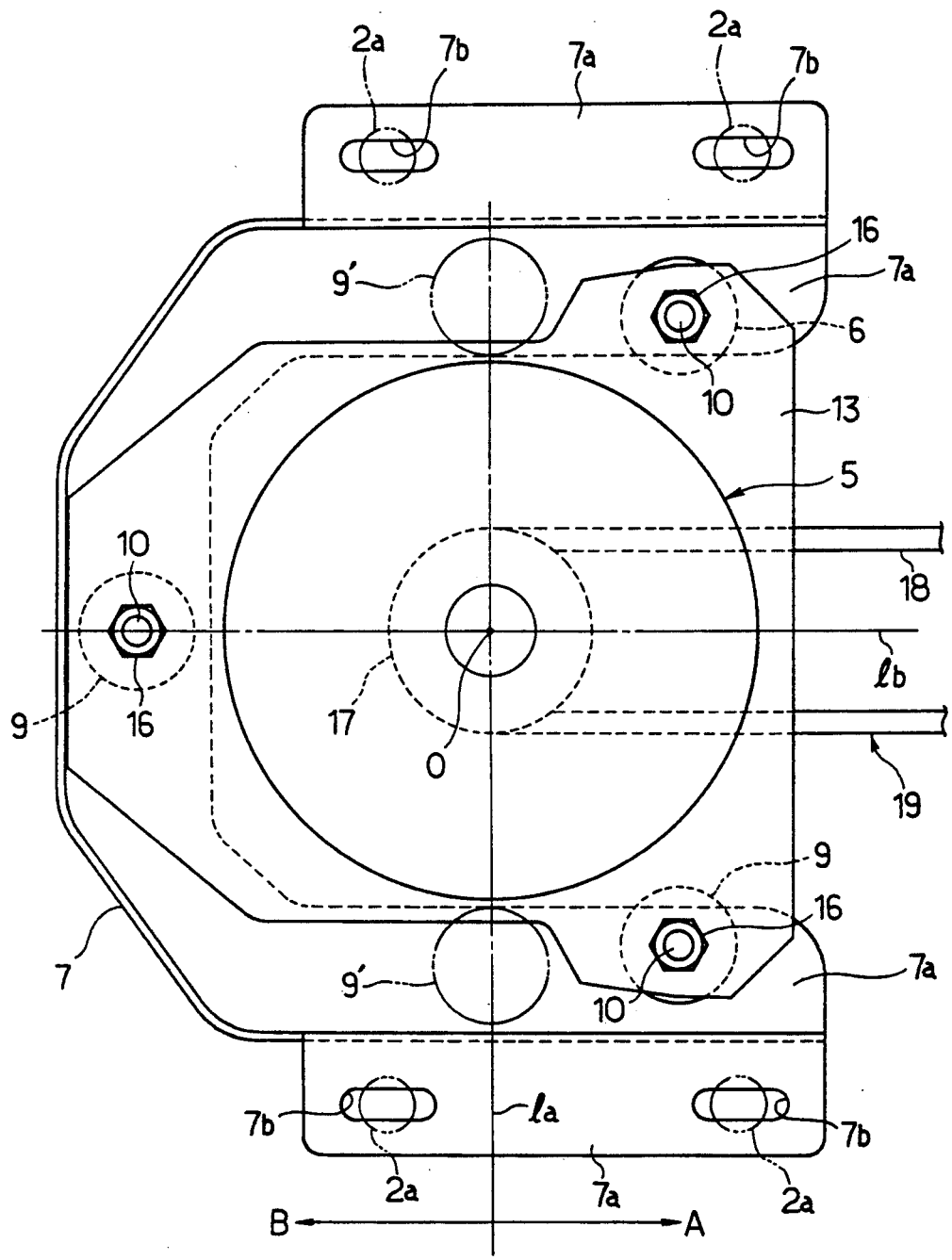
FIG. 4 is an enlarged plan view taken along line IV—IV in FIG. 2.

An embodiment of to the arrangement of buffers 6 will now be described. Referring to FIG. 4, motor 5 is divided, on a plane, into a transmission side portion A (or a driven load side) and a counter transmission portion B (or a side opposite to the driven load side) by a center line 1a drawn through the center 0 of drive shaft 5a. Elastic bodies 9 of two of the three buffers 6 are disposed in the transmission side A so as to be opposed to each other with respect to another center line 1b drawn through the center 0 so as to intersect at right angle with line 1a. Elastic body 9 of the other buffer 6 is disposed away from the line 1a in counter transmission side B so as to be on line 1b. Straight lines connecting the centers of buffers 6 forms a equilateral triangle whose center is on the center of drive shaft 5a.

In operation, upon start of the washing operation, rotation of drive shaft 5a of motor 5 is transmitted to the pulley of transmission 4 through pulley 17 and belt 18. Transmission 4 drives an agitator in wash and a rinse steps and rotating tub 3 in a water extracting, or spin-dry step. Rotation of motor 5 causes mechanical and electromagnetic vibrations, which are transmitted to bracket 13. However, since the three elastic bodies 9 having no metallic cores are interposed between bracket 13 and motor mount 7, vibration of bracket 13 is effectively absorbed by buffer action, thereby preventing the transmission of vibration to motor mount 7. Consequently, water-receiving tub 2 is prevented from being vibrated owing to vibration of motor 5, thus effectively reducing the noise due to vibration of motor 5. Furthermore, should nuts 15 and 16 be loosened and fall off for some reason, bracket 13 of motor 5 is held on upper side 7c of motor mount 7 positioned beneath bracket 13. Consequently, motor 5 is prevented from falling off immediately after disengagement of nuts 15 and 16 from respective bolts 10 and 11. In addition, motor mount 7 is mounted on bosses 2a by screws 8. Since the vibration transmission to motor mount 7 is prevented as described above, screws 8 are not easily loosened and accordingly, motor mount 7 is not likely to be disconnected from bosses 2a of water-receiving tub 2.

Since each elastic body 9 disposed between upper side 7c of motor mount 7 and motor bracket 13 undergoes a compressive load from motor 5, the strength of each elastic body 9 is rendered stable against deterioration due to age as compared with the case where each elastic body 9 is subjected to a tensile load.

Figure 2:
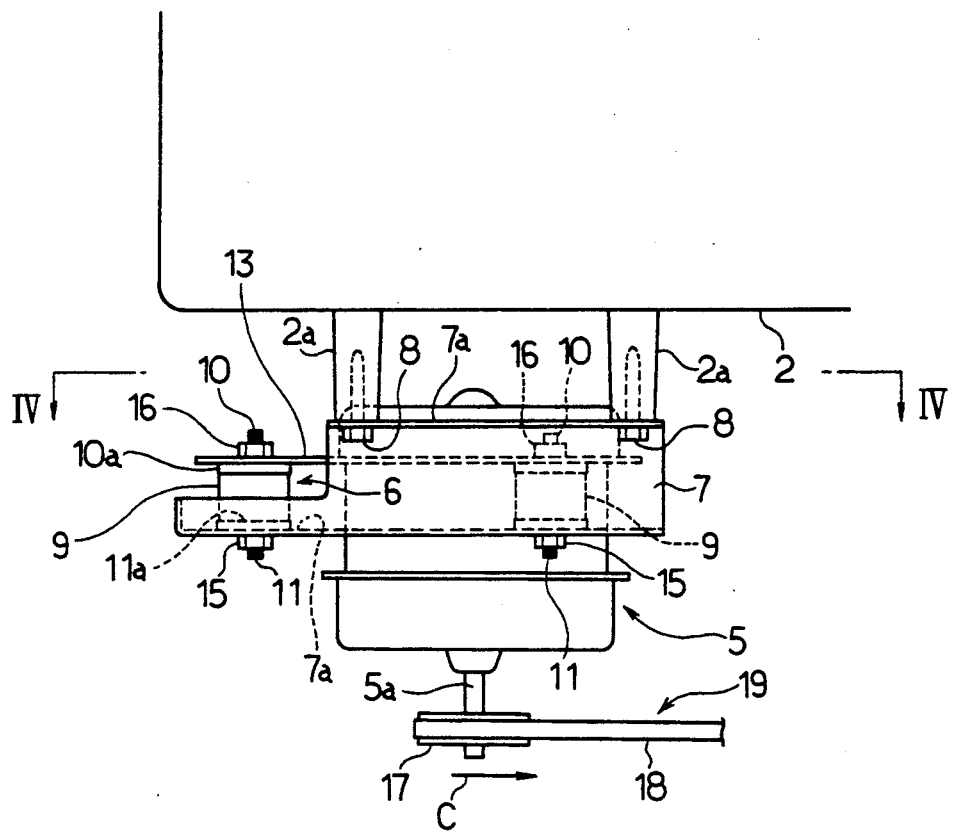
FIG. 2 is a side view of the motor mounting section of the washing machine.

On the other hand, when a tensile force of belt 18 of belt transmission mechanism 19 acts on drive shaft 5a of motor 5, motor 5 is inclined in the direction of arrow C in FIG. 2. Consequently, a compressive force acts on elastic body 9 disposed in the counter transmission side B and a tensile force acts on elastic bodies 9 in the transmission side A. Now, suppose that two elastic bodies 9' formed in the same manner as elastic bodies 9 are disposed on center line 1a so as to be opposed to each other with respect to center line 1b, as shown by alternate long and two short dashes line in FIG. 4. In this case, when motor 5 is inclined in the direction of arrow C in FIG. 2, the compressive force acts on the half portion of each elastic body positioned in counter transmission side B and the tensile force acts on the other half of each elastic body positioned in transmission side A. Thus, when the compressive and tensile forces simultaneously act on a single elastic body 9', it undergoes a bending stress at the portion on which the compressive force is acting (or positioned in the counter transmission side B). When such a bending stress is repetitively applied to an elastic body, it is deteriorated. However, in the present embodiment, only the compressive force acts on elastic body 9 positioned in the counter transmission side B and only the tensile force acts on elastic bodies 9 positioned in the transmission side A, a s described above. Consequently, each elastic body 9 does not undergo both the compressive and tensile forces simultaneously, with the result that each elastic body 9 does not undergo the bending stress, thereby preventing deterioration thereof due to the bending stress.

In the foregoing embodiment, one elastic body 9 is disposed in the side where it undergoes the compressive force, the counter transmission side B, and two elastic bodies 9 are disposed in the side where they undergo the tensile force, the transmission side A. More specifically, each elastic body 9 which end plates 10a to which end plates 10a has high strength against the compressive force but relatively low strength against the tensile force. Accordingly, when the arrangement of three elastic bodies 9 is such that one is disposed in the side where the compressive force acts on the elastic body and the other two are disposed in the side where the tensile force acts on the elastic bodies, sufficient strength of the elastic bodies may be obtained in the side where the tensile force acts on two elastic bodies as well as in the other side where the compressive force acts on one elastic body.

Since metallic end plates 10a and 11a are secured to both ends of each elastic body 9 respectively, there is no possibility that the motor vibration will cause the elastic bodies 9 to wear out, even though each elastic body 9 is essentially soft for the purpose of vibration absorption. Additionally, since each set of end plates 10a, 11a and elastic body 9 is heated to be joined, the interfaces each have sufficient strength.

Although an independent motor mount 7 is shown secured to bosses 2a by screws in the foregoing embodiment, the motor mount may also be integrally formed on the outer bottom of water-receiving tub 2.

Although motor bracket 13 is mounted on a single motor mount 7 with three buffers 6 interposed therebetween in the foregoing embodiment, four or more buffers may be used in a dispersed arrangement as above and motor bracket 13 mounted on motor mount 7 through the elastic bodies so disposed. Alternatively, three buffers and three independent motor mounts may be employed.

The foregoing disclosure and drawings are merely illustrative of the principles of the present invention and are not to be interpreted in a limiting sense. The only limitation is to be determined from the appended claims

What we claim is:

1. A motor mounting structure for a washing machine wherein a motor is mounted on a water-receiving tube, the motor being provided with a bracket which is integral with the motor and a pulley mounted on a drive shaft downwardly projected so that a driven load is coupled to the drive shaft through a belt, said motor mounting structure comprising:
   a) a motor mount provided on the outer bottom of the water-receiving tub, the motor mount having an upper side; and
   b) a buffer interposed between the motor bracket and the upper side of the motor mount so as to be subjected to a compressive force through the bracket, said buffer including a lumped non-metallic elastic body having two ends and two end plates, each end plate being secured to a different one of the end surfaces of the elastic body and coupled to a different one of the bracket and the upper side of the motor mount.

2. A motor mounting structure according to claim 1, further comprising a plurality of buffers interposed between the motor bracket and the upper side of the motor mount and dispersively disposed in a driven load side and a side opposite thereto with respect to the motor drive shaft.

3. A motor mounting structure according to claim 2, wherein the number of the buffers is larger in the driven load side than in the side opposite thereto with respect to the motor drive shaft.

4. A motor mounting structure according to claim 1, wherein the motor mount has a generally U-shaped configuration and the motor is mounted on the motor mount so as to be disposed in a central space of the U-shaped motor mount.

5. A motor mounting structure according to claim 1, wherein thermal bonding layers are provided between the end plates and the elastic body for securing the end plates to the elastic body.

6. A motor mounting structure according to claim 2, wherein thermal bonding layers are provided between the end plates and the elastic body for securing the end plates to the elastic body.

7. A motor mounting structure according to claim 3, wherein thermal bonding layers are provided between the end plates and the elastic body for securing the end plates to the elastic body.

8. A motor mounting structure according to claim 4, further comprising a plurality of buffers interposed between the motor bracket and the upper side of the motor mount and dispersively disposed in a driven load side and a side opposite thereto with respect to the motor drive shaft.

9. A motor mounting structure according to claim 8, wherein the number of the buffers is larger in the driven load side than in the side opposite thereto with respect to the motor drive shaft.

10. A motor mounting structure according to claim 9, wherein thermal bonding layers are provided between the end plates and the elastic body for securing the end plates to the elastic body.

11. A motor mounting structure for a washing machine wherein a motor is mounted on a water-receiving tub, the motor being provided with a bracket which is integral with the motor and a pulley mounted on a drive shaft downwardly projected so that a driven load is coupled to the drive shaft through a belt, said motor mounting structure comprising:
    a) a motor mount provided on the outer bottom of the water-receiving tub, the motor mount having an upper side; and
    b) buffer means interposed between the motor bracket and the upper side of the motor mount so as to be subjected to a compressive force through the bracket.

12. A motor mounting structure according to claim 11, wherein said buffer means comprises a lumped non-metallic elastic body having two ends and first and second end plates, the first end plate being secured to one of the end surfaces of the elastic body and coupled to the bracket, and the second end plate being secured to the other end surface of the elastic body and coupled to the upper side of the motor mount.

13. A motor mounting structure according to claim 11, wherein said buffer means comprises a plurality of lumped non-metallic elastic bodies, each having two ends and first and second end plates, the first end plate being secured to one of the end surfaces of the elastic body and coupled to the bracket, and the second end plate being secured to the other end surface of the elastic body and coupled to the upper side of the motor mount.

14. A motor mounting structure according to claim 13, wherein the number of the buffers is larger in the driven load side than in the side opposite thereto with respect to the motor drive shaft.

15. A motor mounting structure according to claim 12, wherein the motor mount has a generally U-shaped configuration and the motor is mounted on the motor mount so as to be disposed in a central space of the U-shaped motor mount.

16. A motor mounting structure according to claim 14, wherein the motor mount has a generally U-shaped configuration and the motor is mounted on the motor mount so as to be disposed in a central space of the U-shaped motor mount.

17. A motor mounting structure according to claim 14, wherein thermal bonding layers are provided between the end plates and the elastic body for securing the end plates to the elastic body.

18. A motor mounting structure according to claim 16, wherein thermal bonding layers are provided between the end plates and the elastic body for securing the end plates to the elastic body.

* * * * *